United States Patent
Binder et al.

(10) Patent No.: US 10,414,987 B2
(45) Date of Patent: Sep. 17, 2019

(54) SYSTEM AND METHOD FOR THERMOCATALYTIC TREATMENT OF MATERIAL AND PYROLYSIS OIL PRODUCED THEREWITH

(71) Applicant: Fraunhofer-Gesellschaft zur Förderung der angewandten Forschung e.V., Munich (DE)

(72) Inventors: Samir Binder, Illschwang (DE); Michael Jakuttis, Sulzbach-Rosenberg (DE); Andreas Apfelbacher, Amberg (DE); Andreas Hornung, Karlsruhe (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 121 days.

(21) Appl. No.: 15/301,569

(22) PCT Filed: Apr. 14, 2015

(86) PCT No.: PCT/EP2015/058102
§ 371 (c)(1),
(2) Date: Oct. 3, 2016

(87) PCT Pub. No.: WO2015/158732
PCT Pub. Date: Oct. 22, 2015

(65) Prior Publication Data
US 2017/0114284 A1 Apr. 27, 2017

(30) Foreign Application Priority Data
Apr. 15, 2014 (DE) .......................... 10 2014 105 340

(51) Int. Cl.
*C10G 1/02* (2006.01)
*C10G 1/10* (2006.01)
(Continued)

(52) U.S. Cl.
CPC .................. *C10G 1/02* (2013.01); *C10B 7/10* (2013.01); *C10B 31/04* (2013.01); *C10B 47/44* (2013.01);
(Continued)

(58) Field of Classification Search
CPC ........... C10B 1/02; C10B 47/44; C10B 53/00; C10B 57/18
See application file for complete search history.

(56) References Cited

U.S. PATENT DOCUMENTS 3,518,181 A * 6/1970 Tse ............................ C10G 1/02
208/411
3,794,565 A * 2/1974 Bielski ...................... C10B 1/10
202/100
(Continued)

FOREIGN PATENT DOCUMENTS

| CN | 102186948 A | 9/2011 |
|---|---|---|
| CN | 102585860 B | 1/2014 |

(Continued)

OTHER PUBLICATIONS

Hornung, A., et al., "Intermediate pyrolysis: A sustainable biomass-to-energy concept—Biothermal valorization of biomass (BtVB) process," dated Aug. 2011, pp. 664-667, vol. 70, Journal of Scientific & Industrial Research, National Institute of Science Communication and Information Resources (NISCAIR), Publisher.
(Continued)

*Primary Examiner* — Jonathan Miller
(74) *Attorney, Agent, or Firm* — Brinks Gilson & Lione

(57) ABSTRACT

Systems and methods for thermocatalytic treatment of material are provided. The system can have a charging region to
(Continued)

supply starting material, a preconditioning zone in which preconditioned material is formed from the starting material, a pyrolysis zone in which pyrolyzed material is formed from the preconditioned material, and a separation unit for separation of the pyrolyzed material. In the preconditioning zone and the pyrolysis zone, a heater can be provided for heating of the material. Also provided in the pyrolysis zone are recirculation means with which a solid portion of the pyrolyzed material can be recirculated directly into the region of the pyrolysis zone facing toward the preconditioning zone.

21 Claims, 2 Drawing Sheets

(51) Int. Cl.
  *C10B 7/10*     (2006.01)
  *C10B 53/00*    (2006.01)
  *C10B 31/04*    (2006.01)
  *C10B 47/44*    (2006.01)
  *C10B 53/02*    (2006.01)
  *C10B 53/08*    (2006.01)

(52) U.S. Cl.
  CPC .............. *C10B 53/00* (2013.01); *C10B 53/02* (2013.01); *C10B 53/08* (2013.01); *C10G 1/10* (2013.01); *C10G 2300/1003* (2013.01); *C10G 2300/4081* (2013.01); *Y02E 50/14* (2013.01)

(56) References Cited

U.S. PATENT DOCUMENTS

| | | | | |
|---|---|---|---|---|
| 4,084,521 | A * | 4/1978 | Herbold | B29B 17/04 |
| | | | | 110/242 |
| 4,094,769 | A * | 6/1978 | Brown | C10B 47/44 |
| | | | | 201/33 |
| 4,098,649 | A | 7/1978 | Redker | |
| 6,084,147 | A | 7/2000 | Mason | |
| 8,282,787 | B2 * | 10/2012 | Tucker | C10B 47/30 |
| | | | | 201/41 |
| 9,359,556 | B2 * | 6/2016 | Teal | C10B 1/10 |
| 2007/0043246 | A1 | 2/2007 | Bridle | |
| 2008/0128259 | A1 * | 6/2008 | Kostek | B01D 5/0006 |
| | | | | 201/4 |
| 2011/0048915 | A1 * | 3/2011 | Gaga | C02F 11/10 |
| | | | | 201/2.5 |
| 2011/0258914 | A1 | 10/2011 | Banasiak et al. | |

FOREIGN PATENT DOCUMENTS

| | | |
|---|---|---|
| CN | 102585860 B | 1/2015 |
| DE | 25 20 152 C2 | 11/1975 |
| DE | 38 26 520 C2 | 2/1990 |
| DE | 103 07 438 A1 | 9/2004 |
| DE | 103 48 142 B3 | 4/2005 |
| DE | 10 2009 007 457 A1 | 8/2010 |
| JP | H04-180878 | 6/1992 |
| JP | 2000-218259 | 8/2000 |
| JP | 2000-248282 | 9/2000 |
| JP | 2005-537368 | 12/2005 |
| JP | 2012-136672 | 7/2012 |
| WO | WO 02/50484 A1 | 6/2002 |
| WO | WO 2009/138757 A2 | 11/2009 |
| WO | WO 2010/047283 A1 | 4/2010 |
| WO | WO 2010/130988 A1 | 11/2010 |

OTHER PUBLICATIONS

Hossain, A.K., et al., "Experimental investigation of performance, emission and combustion characteristics of an indirect injection multi-cylinder CI engine fueled by blends of de-inking sludge pyrolysis oil with biodiesel," dated May 17, 2012, pp. 135-142, Fuel 105 (2013) 135-142, © 2012 Elsevier Ltd.

Mahmood, A.S.N., et al., "The intermediate pyrolysis and catalytic steam reforming of Brewers spent grain," dated Nov. 2, 2012, pp. 328-243, Journal of Analytical and Applied Pyrolysis 103 (2013) 328-342, © 2012 Elsevier Ltd.

Samanya, J., et al., "Thermal stability of Sewage Sludge Pyrolysis oil," dated 2011, pp. 66-74, vol. 1, No. 3, International Journal of Renewable Energy Research, IJRER.

International Search Report with English translation, dated Jul. 13, 2015, pp. 1-4, issued in International Application No. PCT/EP2015/058102, European Patent Office, Rijswijk, The Netherlands.

Australian Examination Report No. 1, issued in Australian Patent Application 2015248924, dated Oct. 15, 2018, pp. 1-4, IP Australia, Phillip, Australia.

English translation of Indonesian Office Action, issued in Indonesian Patent Application P00201606929, dated Jan. 25, 2019, pp. 1-5, Directorate General of Intellectual Property Rights (DGIP) of Indonesia, Jakarta, Indonesia.

* cited by examiner

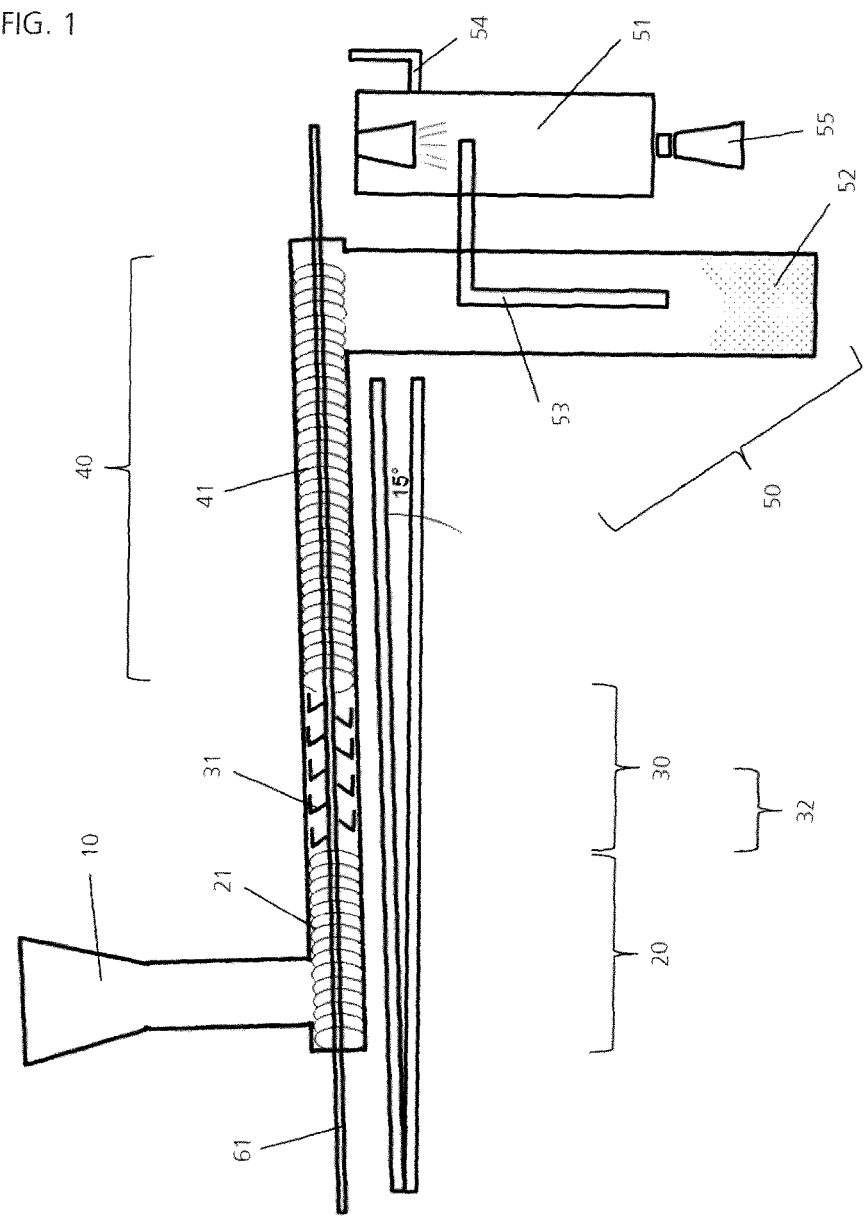

SYSTEM AND METHOD FOR THERMOCATALYTIC TREATMENT OF MATERIAL AND PYROLYSIS OIL PRODUCED THEREWITH

CROSS-REFERENCE TO RELATED APPLICATIONS

This application is a 371 nationalization of PCT/EP2015/058102, entitled "SYSTEM AND METHOD FOR THERMOCATALYTIC TREATMENT OF MATERIAL AND PYROLYSIS OIL PRODUCED THEREWITH," having an international filing date of Apr. 14, 2015, the entire contents of which are hereby incorporated by reference, which in turn claims priority under 35 USC § 119 to German patent application DE 10 2014 105 340.0 filed on Apr. 15, 2014, the entire contents of which are hereby incorporated by reference.

TECHNICAL FIELD

The invention relates to a system and to a method for thermocatalytic treatment of material and pyrolysis oil produced therewith.

BACKGROUND

Pyrolysis is the thermal transformation of carbon-containing starting materials, for example, biomass, into liquid pyrolysis concentrate (pyrolysis oil), solid pyrolysis coke and pyrolysis gas as pyrolysis products, and the method takes place under the exclusion of oxygen or at least essentially without the presence of oxygen. Pyrolysis is usually an endothermal process, however, individual substeps can also proceed exothermally. The percentage of the above-named pyrolysis products can be affected firstly by the choice of starting material (and in particular also due to its residual moisture) and secondly, by the prevailing process conditions, in particular the pyrolysis temperature, the pyrolysis time (dwell time) and by the rates of heating and cooling.

Frequently the heat consumption of a pyrolysis reaction can be supplied through combustion of pyrolysis coke and similar material, and/or through combustion of pyrolysis gas.

Thus pyrolysis represents a method in which, under specific conditions without the presence of oxygen and at temperatures between 270 and 1030° C., specific products such as gas, oil or charcoal can be produced for a broad range of applications. A distinction is made between fast pyrolysis (flash and fast pyrolysis) and slow pyrolysis, which is dependent essentially on the heating rate of the employed starting material.

The objective of fast pyrolysis is a maximum yield of liquid products. In this process, up to 45% liquid products are obtained. In this regard the employed biomass must be pyrolysed within seconds; the dwell time of the solid material in the hot zone is thus likewise within the range of seconds. Slow pyrolysis (also called carbonation) has been used for decades for the production of charcoal. The dwell time of the pyrolysis material in the pyrolysis zone here is in the range of hours to days. The heating rates are low in order to generate a maximum percentage of charcoal. In this method only starting material, in particular wood, with a moisture content of <25% is used; the method is not very well suited for other biomaterials as starting material.

An alternative to the above-named pyrolysis methods is pyrolysis in the medium temperature range with moderate dwell times. Document WO 2010/130988 A1 discloses one such method, in which the dwell time can amount to several minutes, depending on the particle diameter of the employed starting material. The pyrolysis here leads to products in which the tar content is reduced.

Document WO 2009/138757 A2 discloses a pyrolysis reactor in which the starting material is transported through the reactor by means of a worm conveyor and is simultaneously pyrolysed therein. At the end of the pyrolysis zone, the gaseous pyrolysis vapor is drawn off; the generated charcoal is carried back to the beginning of the pyrolysis zone via an external worm screw and is used as heat generator so as to obtain a better heat supply to the starting material to be pyrolysed. The ratio of charcoal to fresh starting material can be adjusted via the rotational speed of the outer worm screw; the dwell time in the pyrolysis zone can be adjusted here via the rotational speed of the internal worm screw.

BRIEF DESCRIPTION OF THE DRAWINGS

FIG. 1 shows a tubular reactor which is divided into a preconditioning zone, a pyrolysis zone and a post-conditioning zone;

DETAILED DESCRIPTION

Figure 2A:
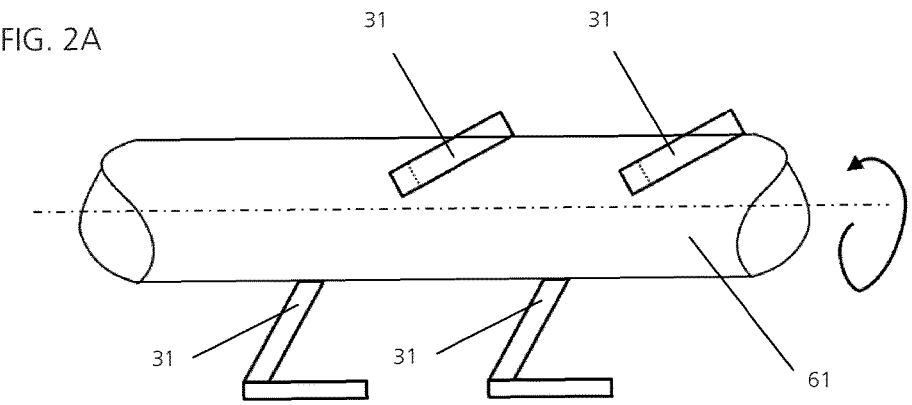
FIG. 2A a view of a section of a shaft with four recirculation hooks or recirculation means arranged thereon.

The present invention is based on the problem of improving the prior art pyrolysis method and specifying a system and a method by which a more targeted influence on the formed product spectrum can be obtained. An additional problem is to obtain higher value pyrolysis products with the pyrolysis method, in particular gaseous pyrolysis products with elevated heating value and/or liquid pyrolysis oils which are suitable—at least when mixed with other oils—as fuel, for example, biodiesel, and/or to obtain solid pyrolysis products which are suitable as fertilizers or soil enhancers.

At least one of these problems is solved by the system, the method and the pyrolysis oil according to the independent claims. The dependent claims, the following description and the examples and figures provide the teaching about favorable refinements of the invention.

A system for thermocatalytic treatment of material, in particular of waste material, comprises a charging region, a preconditioning zone, a pyrolysis zone and a separation unit. In the charging region, the starting material to be treated is supplied to the actual pyrolysis system.

First heating means are arranged in the preconditioning zone with which the supplied starting material can be heated to a temperature of at least 150° C., wherein preconditioned material is formed.

Second heating means are arranged in the pyrolysis zone with which the preconditioned material can be heated to a temperature of at least 350° C. Furthermore, recirculation means are provided in the pyrolysis zone (especially in the downstream part of the pyrolysis zone) with which the solid portion of the formed pyrolysis material can be returned at least in part into the region of the pyrolysis zone facing toward the preconditioning zone (therefore in the upstream part of the pyrolysis zone). The recirculation means are designed such that the recirculation of the solid portion occurs by direct means (that is, "directly"), this means that this solid portion does not leave the pyrolysis zone and in particular does not pass through the preconditioning zone again. Or expressed differently, "direct" means that the recirculation means are in direct contact with the material to be recirculated on the one hand, and are in direct contact with the material to be pyrolysed on the other hand.

Finally, a separation of the obtained pyrolysed material occurs in the separation unit, in particular into a solid, a liquid and a gaseous phase.

It is self-evident that the system is designed such that the pyrolysis zone is permeable so that the gaseous portion of the pyrolysis products can flow out from it at least in a downstream manner. The necessary requisites for this are readily apparent to the skilled person from the prior art.

According to the invention it was recognized that two important advantages can be attained due to the recirculation means in the pyrolysis zone.

Firstly, due to the adjusted method parameters under which the recirculation by the recirculation means occurs (and possibly also through the method parameters of the overall system and their effect on the processes in the pyrolysis zone), the dwell time of the material to be pyrolysed in the pyrolysis zone can be influenced directly and by simple means. But in addition, of course, the influence can take place through the geometry of the recirculation means.

Secondly, due to the direct recirculation at least of the solid portion of the pyrolysed material in the upstream part of the pyrolysis zone, and in particular up to the beginning of the pyrolysis zone, it is assured that freshly formed pyrolysed material can be brought immediately into contact with not yet pyrolysed, preconditioned material. Contacting of the freshly formed pyrolysed material with the preconditioned material is important to the product spectrum attained with the method according to the invention. The method and the above-described system are based on the finding that the freshly formed pyrolysed material acts—due to its increased surface area (due to gasification of the volatile phase)—as catalyst for the pyrolysis of the preconditioned material, and that in particular the freshly formed catalyst leads to a completely different product spectrum of the formed pyrolysed material. In particular, a significantly increased portion of hydrogen in the pyrolysis gas can be obtained, a pyrolysis oil with a very low acid number can be generated and solid pyrolysis products are obtained that are suitable as fertilizers or soil enhancers.

In accordance with one embodiment, the recirculation means are designed, at least in the upstream part of the pyrolysis zone, such that they ensure not only a recirculation of pyrolysed material, but rather additionally also allow a thorough mixing of pyrolysed material and preconditioned material. Accordingly, within the scope of the present invention, recirculation means can be understood to mean not exactly a concrete recirculation means, but rather also understood to mean a combination of various recirculation means and, in particular, different geometries of a particular kind of recirculation means. For example, in the downstream part of the pyrolysis zone, essentially transport in the direction of the upstream part is meaningful; but in the upstream part, mixing of the solid pyrolysed material with the preconditioned material is emphasized. This mixing is particularly important in the region of the pyrolysis zone which directly abuts the preconditioning zone. According to the application, a region of the system or of the reactor is deemed to be the beginning of the pyrolysis zone in which a temperature of more than 150° C. prevails and in which simultaneously recirculation means are arranged. The beginning of the pyrolysis zone however, is reached no later than when (even if recirculation means are not actually present) a temperature of more than 350° C. prevails (that is, the temperature of the pyrolysing material is so high that pyrolysis products, especially gaseous pyrolysis products, are formed in significant yield). In other words, the pyrolysis zone can be subdivided into partial zones, wherein recirculation means are not located in all partial zones. But the recirculation means can also be present throughout the entire region.

As already explained, with the system according to the invention, the dwell time of the pyrolysis material in the pyrolysis zone can be adjusted within a very broad range. In particular, the recirculation means can be designed such that during operation of the system, continuous recirculation of the formed, solid pyrolysed material can occur, and specifically such that in the upstream part of the pyrolysis zone, a thorough mixing with the preconditioned material takes place. In this respect there are two particular alternatives conceivable:

Firstly, by means of a twin worm screw, for example, a steady recirculation can occur, and gaps in the worm screw elements as necessary for the mixing, can be provided at least in the upstream part.

Secondly, operation of the system is also possible in a first and in a second operating state. In actual operation, quasi-continuous operation will occur due to "melding" of the two operating states. In the first operating state, the preconditioned material will be advanced (in particular due to the conveyance means disposed in the post-conditioning zone and/or via means which can create a correspondingly high pressure in the charging region and/or in the preconditioning zone); due to this advance, the material present in the pyrolysis zone will be moved essentially in the direction of the separation unit (that is, downstream).

In the second operating state no advance of the preconditioned material into the pyrolysis zone will occur, or rather only an advance to a very minor extent, so that the recirculation means in the pyrolysis zone can perform its primary mission and can transport pyrolysed material upstream back through the pyrolysis zone (that is, in the region of the pyrolysis zone facing toward the preconditioning zone). Due to appropriate cycling of the first and of the second operating states with an appropriate control element provided for this purpose, the dwell time of the pyrolysis material in the pyrolysis zone can be adjusted precisely so as to optimize the obtained product spectrum and in addition, the mixing ratio of catalyst (thus of the solid portion of pyrolysed material) and preconditioned material can also be adjusted.

According to an additional embodiment, the system according to the invention is designed such that in the charging region and/or in the preconditioning zone it is possible to operate the system essentially free of oxygen. In this respect, inert gas supply lines or similar items can be provided.

The system according to the invention, and in turn, the pyrolysis zone of the system in particular, can be designed particularly as a kind of multi-stage worm screw or rotary tube reactor.

According to one embodiment, the system according to the invention can be a tubular reactor in which the preconditioning zone and the pyrolysis zone merge directly into one another. Thus effective contacting of the preconditioned material with the solid, catalytically acting pyrolysis product formed in the downstream part of the pyrolysis zone can occur.

According to an additional embodiment, in the system according to the invention, a post-conditioning zone is connected downstream of the pyrolysis zone. This post-conditioning zone is then disposed between the pyrolysis zone and separation unit. In the post-conditioning zone, a refinement of the pyrolysed material can occur. For example, stabilization of the charcoal (especially through reduction of the oxygen/carbon and of the hydrogen/carbon ratio) and/or an increase in the heating value of the gaseous pyrolysis products (perhaps via the water gas-shift reaction and/or steam reformation) or an increase in the quality of the formed pyrolysis oil can be achieved. Thus in the post-conditioning zone, usually third heating means are disposed with which the temperature of the material from the pyrolysis zone can be maintained or even increased. In contrast to the pyrolysis zone, in the post-conditioning zone usually no recirculation means are supplied. According to the application, the post-conditioning zone is viewed as the region of the system or of the reactor in which no more recirculation means are provided. In addition, the temperature in this zone can also be greater than in the pyrolysis zone, and in particular can even be more than 700° C.

According to another embodiment, in the preconditioning zone of the system according to the invention (and usually also in the post-conditioning zone—provided one is included in the system) conveyance means are provided to transport the starting material to the pyrolysis zone (or in the case of the post-conditioning zone, conveyance means to transport the pyrolysed material to the separation unit). Some possible conveyance means (both for the pyrolysis zone and also for the post-conditioning zone) can be, for example, worm conveyors and/or belt conveyors, for example, on a conveyor worm screw arranged on a shaft rotating along the longitudinal axis of the preconditioning zone and, where appropriate, of the post-conditioning zone.

According to an additional embodiment, the recirculation means are disposed on a shaft rotating essentially along the longitudinal axis of the pyrolysis zone. In this respect it can pertain to a shaft—in order to obtain a particularly simple design of the system—on which are arranged not only the recirculation means, but also the transport means (for example, the conveyor worm screw) in the region of the preconditioning zone and possibly also of any provided post-conditioning zone. Moreover—provided the recirculation means are not rotating on a shaft—only the conveyor means of the preconditioning zone and of the post-conditioning zone can be arranged on the same shaft (which then usually runs through the pyrolysis zone).

According to another variant of the invention, the recirculation means can be disposed on the reactor interior wall of the pyrolysis zone. In this regard movement of the recirculation means can thus occur, for example, in that the reactor wall is rotated. But the movement of the recirculation means can also take place independently thereof. In contrast to this, the recirculation means in the embodiment arranged on the shaft can be operated by the shaft itself (either simultaneously with the conveyance means in the pyrolysis zone and possibly in the post-conditioning zone), but in particular independently of the conveyance means of the preconditioning zone, for example when operating in the two operating states as described above.

The recirculation means according to the present invention can be, in particular, back-mixing worm screw elements, contrarotating worm screw elements, recirculation bars (especially on the reactor wall) and/or recirculation hooks. The geometry of the recirculation hooks is selected especially so that thorough mixing of pyrolysed material and preconditioned material is ensured by means of an upstream applied pulse. It is especially important for the recirculation means that they ensure a "counter-conveyance movement," so that either a partial stream of the material stream present in the pyrolysis zone can be guided steadily upstream in the pyrolysis zone, or in operation with two operating states, upstream transport of solid pyrolysis products can occur at least in one of the two operating states.

In accordance with an additional embodiment, the system is designed for thermocatalytic treatment such that the longitudinal axis of the pyrolysis zone is inclined with respect to a horizontal plane, usually at an angle of 0° to 45°, in particular of 0° to 25°, and for example of 0° to 10°. The inclination is usually chosen such that gravity within the pyrolysis zone will act upon the material present in the pyrolysis zone so that this material (at least, in the event that no propulsion occurs in the preconditioning zone) will move in the upstream direction and/or can be more easily transported in the upstream direction by the recirculation means.

At least one of the problems stated above is also solved by the following method. This method can be implemented in particular with the system described above, so that all embodiments of the system described above also apply to the method, and vice-versa.

The method for thermocatalytic treatment of material, in particular of waste materials, comprises the following steps:
  A) Preconditioning
  B) Pyrolysis
  D) Separation
And in addition, a post-conditioning step C) may also be included.

In step A), the starting material to be treated is preconditioned in a preconditioning zone, by heating to a temperature of at least 150° C., usually to a temperature of 250° C. and frequently to a temperature of 350° C. In this step preconditioned material is formed.

In step B), the preconditioned material is heated in the pyrolysis zone to a temperature of 250° C. to 700° C., in particular 350° C. to 500° C. The dwell time in the pyrolysis zone of the material being pyrolysed, lasts for one minute up to one hour, in particular one minute up to 30 minutes, for example, 5 minutes to 15 minutes. The material obtained at the end of the pyrolysis zone is called "pyrolysed material." The term "dwell time" according to the application refers to the average dwell time of the solid portion, as needed by a solid particle (e.g. pellet) from entrance to the pyrolysis zone until its exit therefrom. According to the application, the dwell time is determined by means of a reference method on a calibrated Plexiglas cold model (that simulates the invented model, except for the materials used to build the thermocatalytic system) and the heating apparatus is simulated (especially with regard to recirculation means and any conveyance means). As "starting material," wood pellets of size class D25 with a length of 20 mm to 30 mm are used. First, commercial wood pellets are passed through a cold model. After all zones are filled with wood pellets, a batch of 25 dyed wood pellets is added and the time is measured for each of the individual dyed pellets to pass from the entrance to the exit from the pyrolysis zone. The average dwell time can be measured optically and directly (especially when this is possible due to the ratio of reactor diameter and pellet size). In larger reactors (which do not permit a purely optical determination) or when the preparation of a Plexiglas model is too complicated, the dwell time can also be determined indirectly by measuring the time needed by each individual pellet to move from the entrance into the preconditioning zone up to the outlet from the post-conditioning zone, or—if the latter is not used—then out from the pyrolysis zone, and the (constant) transit time through the preconditioning zone and any possibly used post-conditioning zone is subtracted. The average dwell time t is obtained as the quotient from the sum of dwell times $t_i$ of the quantity of dyed pellets, wherein the reference method is run twice:

$$\bar{t} = \frac{\sum_{i=1}^{n} t_i}{n}$$

In step B), the pyrolysis can proceed continuously or partly continuously, wherein the partly continuous method pertains in particular to the method described above as operating with two operating states, and continuous method means steady recirculating of pyrolysed material into the upstream region of the pyrolysis zone. As explained above with respect to the system, this recirculating goes directly into the region of the pyrolysis zone facing the preconditioning zone, wherein at least in this upstream region of the pyrolysis zone, mixing of the pyrolysed material with the preconditioned material takes place.

As was explained above, the recirculation of solid, pyrolysed material is especially useful in the region where decomposition of the pyrolysed, preconditioned material begins, since the temperature is already high enough. This is in particular the part of the pyrolysis zone directly following the preconditioning zone.

In contrast to the prior art methods, for the method according to the invention there is no need for a separate heat carrier that must be supplied to the system for thermocatalytic treatment. In principle, the additional use of heat carriers is possible. However, generally this will not be necessary because the catalytically acting, solid pyrolysis products recirculated as per the invention already perform the function of heat transmission.

Starting materials for the method according to the invention pertain in particular to waste substances and biomass. But in addition, the exploitation of electronic scrap, old synthetics such as motor vehicle tires and similar materials is possible. These starting materials pertain to carbon-based material (that is, material with a carbon portion greater than 50 wt %—relative to biomass—in dry condition) such as are present for example, in cellulose-containing materials and such. The biomass frequently contains a mixture of hemi-cellulose, cellulose, lignin and other organic compounds (the latter usually only in small quantities). The second main group of starting materials, besides cellulose-containing materials (such as are present, for example, in brewing residues and such) are manure-containing products and clarified sludges (especially from the treatment of effluent). In addition to these kinds of waste products, in principle also materials such as leaf, straw, spent grain, grape residues and citrus pulp would be conceivable starting material. It is also self-evident that mixtures of the aforementioned materials with each other, or mixtures with other materials are suitable as starting material. Many of the named materials are presently being dumped or are used as "fertilizer" in agricultural applications, which results in over-fertilization of fields. On the other hand, about 25% of the energy potential contained, for example, in brewing residues, is not exploited by biogas systems. According to the prior art, this potential is generally not utilized. The method according to this invention now makes available a highly efficient utilization of these kinds of biomaterials, which contain exclusively or at least largely high-value products.

According to one embodiment, the pyrolysis can proceed at standard pressure (1013 hPa) within the pyrolysis zone; but the pressure can also be higher, for example, more than 200 hPa higher or more than 1000 hPa higher than that. In a particular case, pressures of even up to 30,000 hPa can be present. The rate of advance within the entire system can be controlled by means of the pressure which can build up in the different regions or zones of the system according to the invention. For example, the separation of pyrolysis products can occur at elevated pressure, so that hydrocarbons can be separated simply by means of a pressure control of hydrogen, carbon dioxide and carbon monoxide.

According to another embodiment, the method is implemented such that two operating states can be used in step B)—as was described above with respect to the system.

According to an additional embodiment—as was already indicated above—a post-conditioning step can be conducted between step B) and step D), in which at least the solid portion of the pyrolysed material is treated at a temperature of 450° C. to 800° C., with the proviso that the temperature in step C) is not less than that in step B), so that higher-value pyrolysis products are obtained.

According to an additional embodiment, the starting materials are selected so that they contain at least one of the following chemical elements: Zinc, iron, platinum, rhenium, chromium, copper, manganese, nickel, titanium, aluminum, or silicon. This element need not be present in elemental form; it can also be present in an ionic form or in bonded form (for example, as an oxide compound or in the form of a complex). Metals of this kind are regularly found, for example, in manure and similar material, for instance, because they represent trace elements or arrive in the metabolic cycle in another form. But they can also enter the waste materials due to the specific circumstances in which certain waste materials were obtained, for example, copper from copper boilers. According to the invention it was found that, in particular, the above metals contained in the solid pyrolysis product exert an outstanding catalytic effect as catalyst in the pyrolysis zone. In order to ensure this effect, biomass with a high proportion of metal, such as manure, can be added to biomass which does not contain these metals, in order thus to ensure a particularly efficient process control. But in addition—especially in the case of waste materials (here again, meaning non-biological waste materials)—the metal can be added in small quantities to the starting material.

According to one embodiment, as starting material a material with a moisture content greater than 10 wt % can be used. It is even possible to use material with a moisture content of up to 25 wt %; even material with a moisture content of up to 40 wt % can be used. But the method according to the invention delivers so much valuable pyrolysis products that in addition to operation of the heating means of the system according to the invention through thermal exploitation of the pyrolysis products, predrying of moister—or more generally, of starting materials too moist for the desired product spectrum—is possible. The high water content is allowed according to the invention, since within the scope of the used medium pyrolysis, especially due to the homogeneous and heterogeneous water gas shift reaction and the steam reforming, water from the employed material is consumed and hydrogen can be formed. The method according to the invention is usually characterized in particular in that, due to the catalytic efficiency of the solid pyrolysis products, precisely this hydrogen is increasingly formed. Accordingly, for the method according to the invention, starting materials with clearly greater water contents can be used than in the prior art method, and their use is even expedient. In contrast to this, for example in slow pyrolysis, there is a natural limit of 25 wt % water, in flash pyrolysis usually a water content of less than 10 wt % is required, or a significant predrying of the starting material is necessary.

According to an additional embodiment, step B) is conducted such that in the pyrolysis zone, a heating rate of the supplied material of 1 to 10° C./s, in particular of 2-10° C./s, is used. Furthermore, according to an additional embodiment, the method is conducted such that starting material with an average particle size greater than 1 mm, in particular from 5 to 40 mm, is used (the particle size here is determined by a sifting method). Due to the stated heating rates and/or particle sizes, particularly effective implementation of the medium pyrolysis can take place. In contrast thereto, for fast pyrolysis and flash pyrolysis a clearly faster heating rate and, associated therewith, a clearly smaller particle size, is needed.

The objectives defined above are (at least partly) solved by the method described above and with the pyrolysis products obtained from the system described above. Usually with the described method about 30 to 50 wt % of liquid phase is obtained (with 10-15 wt % being oils which are formed in addition to a separable aqueous phase), 20 to 60 wt % gas phase and 15 to 40 wt % solids, in particular charcoal and charcoal-like solids. The aggregate states pertain to room temperature (20° C.). Provided no post-conditioning step is used, the gas product stream contains up to 20 wt % hydrogen; with post-conditioning via steam reforming, the proportion of hydrogen in the gas product stream can be increased up to as much as 50 wt %. Compared to comparable prior art methods, this represents a huge increase which is attributable to—but is not entirely attributable to—the catalytic effect of the recirculated solid pyrolysis material. The catalytic effect here appears to consist in that the cracking of alkyl chains is accelerated. With the method according to the invention, little or no tar is formed, and if necessary, can be removed from the gas stream by simple methods, such as a RME scrubbing.

The oils obtained according to the invention are characterized primarily by high heating values which are usually greater than 20 MJ/kg and are often even greater than 30 MJ/kg. In addition, they have a low water content and low acid number. Due to these properties, they are not only miscible with biodiesel or plant oil: they are even, at least if mixed with other substances, directly usable as biodiesel and thus are usable in engines. The pyrolysis oils display in particular water contents of <2 wt % and acid numbers of <15 mg KOH/g, in particular <4 mg KOH/g, wherein reference is made especially to yields of up to 15 wt %.

With most starting material, additionally, pyrolysis oils are obtained in which the oxygen content of the anhydrous pyrolysis oil is far less than 16 wt %. Often the oxygen content is less than 8 wt %. The ratio of oxygen to carbon (that is, the quotient of the oxygen portion and carbon portion, each in wt %) is usually less than 0.15 and is usually even less than 0.12. The weight ratio of hydrogen/carbon, however, is frequently greater than 0.08, in particular greater than 0.10 and often even greater than 0.11. Consequently, it turns out that most pyrolysis oils which can be produced with the method according to the invention have a carbon content greater than 75 wt %, a hydrogen content of 6 to 11 wt % and an oxygen content of up to 9 wt %. Furthermore, the nitrogen content usually amounts to 1.5 to 4.5 wt %, but this value can be greater in the case of clarified sludge.

The values stated in the description, the claims and in the examples were always determined according to the following procedure:

Acid number as per DIN 51558-1: 1979-07,
Oxygen content as per DIN EN 15296 (calculated),
Carbon content, hydrogen content and nitrogen content as per DIN EN 15104,
Heating value (qp, led) as per DIN EN 14918,
Ash content as per DIN EN 14775, but at 815° C.

At this juncture it should be pointed out that (unless explicitly stated otherwise) the contents of hydrogen, oxygen, carbon and nitrogen corresponding to current measurement methods pertain only to the weight of the organic components of the pyrolysis oil and ash; water contained in the pyrolysis oil is accordingly left out of consideration.

The invention will be explained in greater detail below with reference to the figures and to one concrete example:

FIG. 1 shows a tubular reactor which is divided into a preconditioning zone 20, a pyrolysis zone 30 and a post-conditioning zone 40. The upstream portion of the pyrolysis zone 30 is the "preconditioning zone 20 facing region 32." The material to be pyrolysed is supplied to this reactor via an air-tight charging region 10 and then the material is conveyed into the pyrolysis zone via a conveyor worm screw 21 disposed in the preconditioning zone 20. In the pyrolysis zone 30 there are recirculation hooks provided as recirculation means 31. An additional conveyor worm screw 41 is also disposed in the post-conditioning zone 40. The conveyor worm screws 21 and 41 and also the recirculation means 31 are arranged on mutually engaged shafts 61. The heating means are not shown. The longitudinal axis of the reactor is inclined at an angle of 15° with respect to the horizontal plane. The separation unit 50 is connected downstream from the reactor; this separation unit is organized into a gas-tight charcoal extractor 52, a biodiesel-operated spray absorber 51 which is connected to the coal extractor 52 via a supply line 53 and which separates the liquid phase from the gas phase, and also a separator unit 55 to separate the pyrolysis water from the oil phase. The gas phase can be collected through an outlet 54. FIG. 2A provides a detailed view of FIG. 1. This figure provides a view of a section of shaft 61 with four recirculation hooks or recirculation means 31 arranged thereon. The recirculation hooks are arranged to overlap on the shaft, so that there are no empty spaces on the shaft. Two additional hooks (not visible) are located on the back side of shaft 61. FIG. 2B again provides an enlarged view of a recirculation hook and/or recirculation means 31.

Figure 2B:
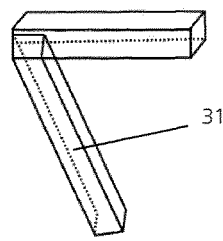
FIG. 2B provides an enlarged view of a recirculation hook and/or recirculation means.

The method can be operated, for example, with brewing residues in the form of pellets as supplied material, and using the above system as per FIGS. 1, 2A and 2B. With respect to the tubular reactor, the dimensional relationships in FIG. 1 and FIG. 2A roughly correspond to the real values. The tubular reactor has a length of about one meter and a diameter of about 10 to 15 cm. The shaft 61 has a diameter of about 5 cm, so that the recirculation hooks extend relatively close to the reactor interior wall in the pyrolysis zone 30. The employed brewing pellets originated from brewing residues from a biogas plant in Germany and were already pelleted when delivered. The pellet diameter was 6 mm. An analysis of the employed material indicated the characteristic values provided in table 1 (the value $H_u$ denotes the lower heating value, and $H_o$ denotes the upper heating value), and the elementary analysis data are provided in table 2.

TABLE 1

| Dry Material | Ignition Loss [%] | $H_u$ As Supplied | $H_o$ | $H_u$ Dry | $H_o$ |
|---|---|---|---|---|---|
| | | [MJ/kg] | | | |
| 88.9 | 90.3 | 15.7 | 17.1 | 18.0 | 19.3 |

TABLE 2

| C | H | N | O | Cl | S |
|---|---|---|---|---|---|
| | | [%] | | | |
| 46.8 | 5.7 | 1.78 | 35.6 | 0.32 | 0.31 |

Figure 3A:
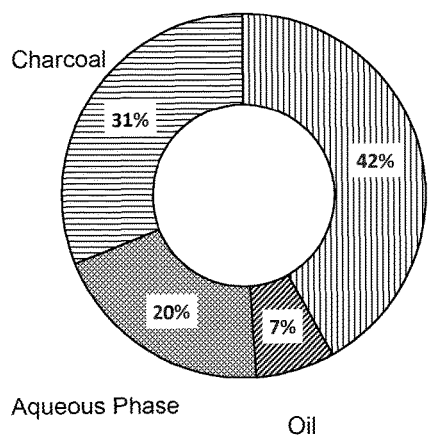
FIG. 3A illustrates an example product spectrum (data in wt %) obtained after passing through a separation unit.
Figure 3B:
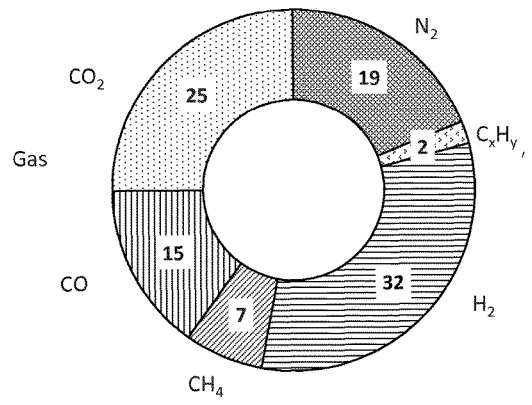
FIG. 3B illustrates the gases in the gaseous portion (data in wt %) obtained after passing through a separation unit.

The temperature in the preconditioning zone 20 was set to 150° C. In the pyrolysis zone 30 further heating to 400° C. was supplied. The post-conditioning zone 40 was heated to 700° C. The entire system was not pressurized. However, due to the pyrolysis in region B), a slight over-pressure prevailed which guided the process downstream. In addition, the embodiment with two operating states was selected, wherein alternately a 10 s operating state 1 (advance) was followed by 15 s in operating state 2 (no advance). After passing through the separation unit 50 as shown in FIG. 1, the product spectrum according to FIG. 3A (data in wt %) was obtained. The gaseous portion contains the gases as indicated in FIG. 3B (data in wt %).

Analysis of the additional portions indicated:

TABLE 3

| (Aqueous Phase) | | | | | |
|---|---|---|---|---|---|
| C | H | N | O | S | $H_o$ |
| | | [%] | | | [MJ/kg] |
| 4.9 | 1.7 | 0.99 | 11 | 0.31 | 2.4 |

TABLE 4

| (Oil) | | | | |
|---|---|---|---|---|
| C | H | N | O | S |
| | | [%] | | |
| 76.8 | 7.4 | 3.8 | 8.7 | 0.6 |
| Water [%] | Ash | TAN [mg KOH/g] | Hu | Ho [MJ/kg] |
| 1.7 | <0.1 | 3.8 | 32.5 | 36.3 |

TABLE 5

| (Charcoal) | | | | |
|---|---|---|---|---|
| C | H | N | O | S |
| | | [%] | | |
| 65.0 | 1.16 | 1.52 | 1.3 | 0.3 |
| Water [%] | Ash | | $H_u$ | $H_o$ [MJ/kg] |
| 0.8 | 29.1 | | 23.4 | 23.7 |

The low acid number (TAN) of 3.8 mg KOH/g and the low water content of the oil (1.7 wt %) should be emphasized.

To clarify the use of and to hereby provide notice to the public, the phrases "at least one of <A>, <B>, ... and <N>" or "at least one of <A>, <B>, <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed.

The invention claimed is:

1. A system for thermocatalytic treatment of material, the system comprising:
a charging region for supplying a starting material to be treated;
a preconditioning zone in which preconditioned material is formed from the starting material;
a pyrolysis zone in which pyrolysed material is formed from the preconditioned material; and
a separation unit for separation of the obtained pyrolysed material,
wherein in the preconditioning zone, a heater is provided for heating of the starting material to a temperature of at least 150° C., and wherein in the pyrolysis zone, a recirculation means is provided, and the heater is also for additional heating of the preconditioned material in the pyrolysis zone to a temperature of at least 350° C., and wherein with the recirculation means, a solid portion of at least the pyrolysed material is recirculatable at least partly and directly into a region of the pyrolysis zone facing toward the preconditioning zone so that the recirculation means comes into direct contact with the recirculated solid portion of pyrolysed material and the preconditioned material to be pyrolysed.

2. The system according to claim 1, wherein the recirculation means are provided at least in the region of the pyrolysis zone facing toward the preconditioning zone such that a thorough mixing of pyrolysed material and preconditioned material is possible.

3. The system according to claim 1, wherein the recirculation means in the pyrolysis zone are configured to affect the dwell time of the material to be pyrolysed in the pyrolysis zone.

4. The system according to claim 1, wherein the system is operable in a first operating state and in a second operating state, wherein in the first operating state, the preconditioned material moves forward, and any material present in the pyrolysis zone is advanced essentially in a direction of the separation unit, and in the second operating state, essentially solely recirculation of pyrolysed material into the region of the pyrolysis zone facing toward the preconditioning zone occurs.

5. The system according to claim 1, wherein inert gas supply lines are provided in the charging region and/or in the preconditioning zone.

6. The system according to claim 1, wherein the preconditioning zone and pyrolysis zone merge into one another and are arranged in a tubular reactor.

7. The system according to claim 1, wherein between the pyrolysis zone and the separation unit there is disposed a post-conditioning zone for refinement of the pyrolysed material, wherein in the post-conditioning zone the heater is further configured to increase or to maintain the temperature of at least the solid portion of the pyrolysed material.

8. The system according to claim 1, wherein conveyance means for transporting the starting material to the pyrolysis zone are provided at least in the preconditioning zone.

9. The system according to claim 1, wherein the conveyance means comprises a worm screw, a worm screw arranged on a shaft, or a belt conveyor.

10. The system according to claim 1, wherein the recirculation means are arranged on a shaft and/or on a reactor interior wall of the pyrolysis zone.

11. The system according to claim 1, wherein the recirculation means comprise back-mixing worm screw elements, contrarotating worm screw elements, recirculation bars and/or recirculation hooks.

12. The system according to claim 1, wherein the longitudinal axis of the pyrolysis zone in respect to a horizontal plane is inclined at an angle of 0° to 45°.

13. A method for thermocatalytic treatment of material, the method comprising:
preconditioning, in a preconditioning zone, a starting material by heating the starting material to a temperature of at least 150° C., wherein preconditioned material is formed by the preconditioning;
pyrolysing the preconditioned material essentially in the absence of oxygen in a pyrolysis zone, wherein the preconditioned material is heated to a temperature of 250° C. to 700° C., wherein the dwell time in the pyrolysis zone of the material being pyrolysed is in a range from one minute up to one hour, and pyrolysed material is formed,
wherein the pyrolysing comprises directly returning pyrolysed material continuously or semi-continuously into a region of the pyrolysis zone facing toward the preconditioning zone, wherein mixing of the pyrolysed material with the preconditioned material takes place at least in the region of the pyrolysis zone facing toward the preconditioning zone, and the pyrolysed material comes into direct contact with the preconditioned material to be pyrolysed; and
separating the pyrolysed material in a separation unit.

14. The method according to claim 13, wherein the pyrolysing the preconditioned material is carried out such that in a first operating state, advance of the preconditioned material into the pyrolysis zone takes place, and material present in the pyrolysis zone is advanced essentially in a direction of the separation unit, and in a second operating state, no advance of the preconditioned material into the pyrolysis zone takes place and essentially recirculation of pyrolysed material into the region of the pyrolysis zone facing toward the preconditioning zone takes place.

15. The method according to claim 13 further comprising, between the pyrolysing the preconditioned material and the separating the pyrolyzed material:
post-conditioning at least a solid portion of the pyrolysed material in a post-conditioning zone at a temperature of 350° C. to 800° C.

16. The method according to claim 13, wherein the starting material includes at least one of the following chemical elements at least in trace amounts in elementary, ionic, or bonded form:
Zinc, iron, platinum, rhenium, chromium, copper, manganese, nickel, titanium, aluminum, or silicon.

17. The method according to claim 13, wherein material with a water content of greater than 10 wt % is used as the starting material.

18. The method according to claim 13, wherein in the pyrolysing the preconditioned material in the pyrolysis zone, a heating rate of 1 to 10° C./s is used.

19. The method according to claim 13, wherein the starting material has an average particle size of greater than 1 mm.

20. The method according to claim 13, wherein pyrolysis oil is obtained by the method, and wherein the starting material comprises a biogenic material selected from the group consisting of a cellulose-containing material, a product containing manure, and a clarified sludge.

21. The method of claim 20, wherein the pyrolysis oil has a water content of less than 2 wt % and an acid number of less than 4 mg KOH/g.

* * * * *